US012253004B1

(12) United States Patent
Sgambati et al.

(10) Patent No.: US 12,253,004 B1
(45) Date of Patent: Mar. 18, 2025

(54) INLET DUCT SYSTEM FOR A HEAT RECOVERY STEAM GENERATOR

(71) Applicant: GE Infrastructure Technology LLC, Greenville, SC (US)

(72) Inventors: Alessandro Sgambati, Baden (CH); Scott William Herman, Enfield, CT (US); Meghan Sheehy, Longmeadow, MA (US); Dimitrios V. Doupis, Avon, CT (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/590,849

(22) Filed: Feb. 28, 2024

(51) Int. Cl.
    *F01D 25/30* (2006.01)
(52) U.S. Cl.
    CPC .................................... *F01D 25/30* (2013.01)
(58) Field of Classification Search
    CPC ........................................................ F01D 25/30
    See application file for complete search history.

(56) References Cited

U.S. PATENT DOCUMENTS

| | | | | |
|---|---|---|---|---|
| 6,851,514 B2* | 2/2005 | Han | ...................... | F28F 9/0263 181/256 |
| 7,713,020 B2* | 5/2010 | Davidson | .............. | F03D 3/0418 415/4.4 |
| 8,641,362 B1 | 2/2014 | Liang | | |
| 8,961,116 B2* | 2/2015 | Lawson, Jr. | ............ | F01D 25/30 415/177 |
| 9,109,466 B2* | 8/2015 | Lo | ........................... | F01D 25/30 |
| 9,546,567 B2 | 1/2017 | Kasibhotla et al. | | |
| 10,280,772 B2* | 5/2019 | AlJwesm | .................. | F01D 9/02 |
| 11,143,058 B2* | 10/2021 | Nanda | ..................... | F01K 23/10 |
| 11,168,588 B2* | 11/2021 | McDeed | ................. | F01N 3/103 |
| 11,365,649 B2* | 6/2022 | Kuwamura | ............ | F01D 25/24 |
| 2004/0255592 A1* | 12/2004 | Braun | ..................... | F01D 25/30 60/39.182 |
| 2011/0236201 A1* | 9/2011 | Shende | .................... | F01D 25/30 415/208.2 |
| 2012/0174586 A1* | 7/2012 | Alexander | ............. | F01D 25/30 60/694 |
| 2015/0240667 A1* | 8/2015 | Nanda | ..................... | F01D 25/30 415/207 |
| 2015/0354382 A1 | 12/2015 | Pakkala et al. | | |
| 2016/0230573 A1* | 8/2016 | Haller | ....................... | F01D 9/02 |
| 2017/0087514 A1* | 3/2017 | Daoud | .................. | F01N 3/2896 |
| 2017/0130596 A1* | 5/2017 | Bhaumik | ................ | F01D 5/143 |
| 2017/0254222 A1* | 9/2017 | Zhang | ....................... | F02C 7/18 |
| 2018/0149085 A1 | 5/2018 | Chennoju et al. | | |
| 2020/0217225 A1* | 7/2020 | Senn | ....................... | F01D 25/30 |
| 2024/0167396 A1* | 5/2024 | Rodriguez-Ramon | ...................... | E21B 43/2607 |

* cited by examiner

*Primary Examiner* — Jesse S Bogue
(74) *Attorney, Agent, or Firm* — Fletcher Yoder, P.C.

(57) ABSTRACT

A system includes an exhaust diffuser system for a heat recovery steam generator (HRSG). The system includes an inlet portion, a diffuser portion axially extending from the inlet portion, and an outlet portion fluidly coupled to an axial distal end of the diffuser portion, wherein an outlet extent of the outlet portion is greater than an inlet extent of the inlet portion. The diffuser portion includes a plurality of wall portions, and the plurality of wall portions is incrementally angled relative to an axial extent extending from the inlet portion to the outlet portion. The system may further include a gas turbine engine coupled to the inlet portion and the HRSG.

23 Claims, 6 Drawing Sheets

FIG. 7 and prevent formation of vortices within an HRSG. Specifically, as will be described in greater detail below, the inlet duct includes a plurality of wall portions (e.g., inner, outer, and sidewall portions) incrementally angled relative to an axial extent of the inlet duct to help mitigate flow detachments and vortices. Indeed, in certain embodiments, an HRSG may intake an exhaust flow via an inlet duct coupled to the HRSG, wherein the inlet duct is coupled to a gas turbine system. Unfortunately, the exhaust flow may become detached from an interior surface of the inlet duct and may cause the formation of one or more vortices between the exhaust flow and the interior surface. This flow detachment from the interior surface of the inlet duct results in pressure loss inside the inlet duct, thereby resulting in an increased backpressure to the connected turbine (i.e., the expansion turbine) and thereby decreased efficiency of the combined cycle power plant that includes the gas turbine system. Accordingly, it would be beneficial to mitigate or prevent the detachment of the exhaust flow from the interior surface of the inlet duct to the HRSG.

INLET DUCT SYSTEM FOR A HEAT RECOVERY STEAM GENERATOR

TECHNICAL FIELD

The subject matter disclosed herein generally relates to an inlet duct system for a heat recovery steam generator.

BACKGROUND

A heat recovery steam generator (HRSG) may intake an exhaust flow via an inlet duct coupled to the HRSG, wherein the inlet duct is coupled to a gas turbine system. Unfortunately, the exhaust flow may become detached from an interior surface of the inlet duct and may cause the formation of one or more vortices between the exhaust flow and the interior surface. This flow detachment from the interior surface of the inlet duct results in pressure loss inside the inlet duct, thereby resulting in an increased backpressure to the connected turbine (i.e., the expansion turbine) and thereby decreased efficiency of the combined cycle power plant that includes the gas turbine system. Accordingly, a need exists for at least mitigating or preventing the detachment of the exhaust flow from the interior surface of the inlet duct to the HRSG.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In certain embodiments, a system includes an exhaust diffuser system for a heat recovery steam generator (HRSG). The system includes an inlet portion, a diffuser portion axially extending from the inlet portion, and an outlet portion fluidly coupled to an axial distal end of the diffuser portion, wherein an outlet extent of the outlet portion is greater than an inlet extent of the inlet portion. The diffuser portion includes a plurality of wall portions, and the plurality of wall portions is incrementally angled relative to an axial extent extending from the inlet portion to the outlet portion.

In certain embodiments, a system includes a gas turbine system, a heat recovery steam generator (HRSG), and an exhaust diffuser system. The exhaust diffuser system includes an inlet portion coupled to the gas turbine system, a diffuser portion axially extending from the inlet portion, and a plenum fluidly coupled to an axial distal end of the diffuser portion, wherein the plenum is coupled to the HRSG, and wherein a plenum extent of the plenum is greater than an inlet extent of the inlet portion. The diffuser portion includes a plurality of wall portions, the plurality of wall portions is incrementally angled relative to an axial extent extending from the inlet portion to the plenum, and the plenum includes a curved wall extending crosswise to the axial extent.

In certain embodiments, a method includes receiving an exhaust flow from a gas turbine via an inlet portion of an exhaust diffuser system. The method further includes expanding the exhaust flow in a diffuser portion of the exhaust diffuser system, wherein the diffuser portion includes a plurality of wall portions incrementally angled from the inlet portion toward an outlet portion of the exhaust diffuser system. The method further includes discharging the exhaust flow into the HRSG via a plenum of the outlet portion, wherein the plenum includes a curved wall extending crosswise to the diffuser portion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As described in greater detail below, the disclosed embodiments include an exhaust diffuser system (e.g., inlet duct) for an HRSG configured to mitigate flow detachments of an exhaust gas flow from an interior surface of a transition portion of the exhaust diffuser system. In certain embodiments, the exhaust diffuser system includes an inlet portion coupled to the transition portion, the transition portion axially extending from the inlet portion. The transition portion includes a plurality of side walls, with one or more side walls having a plurality of wall portions. The wall portions are incrementally angled outward, such that the transition portion gradually expands outward along an axial extent of the transition portion. The gradual expansion of the transition portion mitigates the formation of flow detachments of an exhaust gas flowing through the transition portion from an interior surface of the transition portion, thereby mitigating the formation of vortices between the interior surface and the exhaust gas flow.

In certain embodiments, the transition portion is coupled to a coupling portion. The coupling portion includes a curved wall that extends crosswise to the axial extent of the transition portion. The transition portion is coupled to a convex side of the curved wall of the coupling portion. Additionally, the transition portion is coupled to a bottom portion of the curved wall of the coupling portion. The coupling portion includes an interface with first and second lateral extents. The interface fluidly couples to a lateral side of the HRSG, thereby fluidly coupling the inlet portion and the transition portion to the HRSG.

Figure 1:
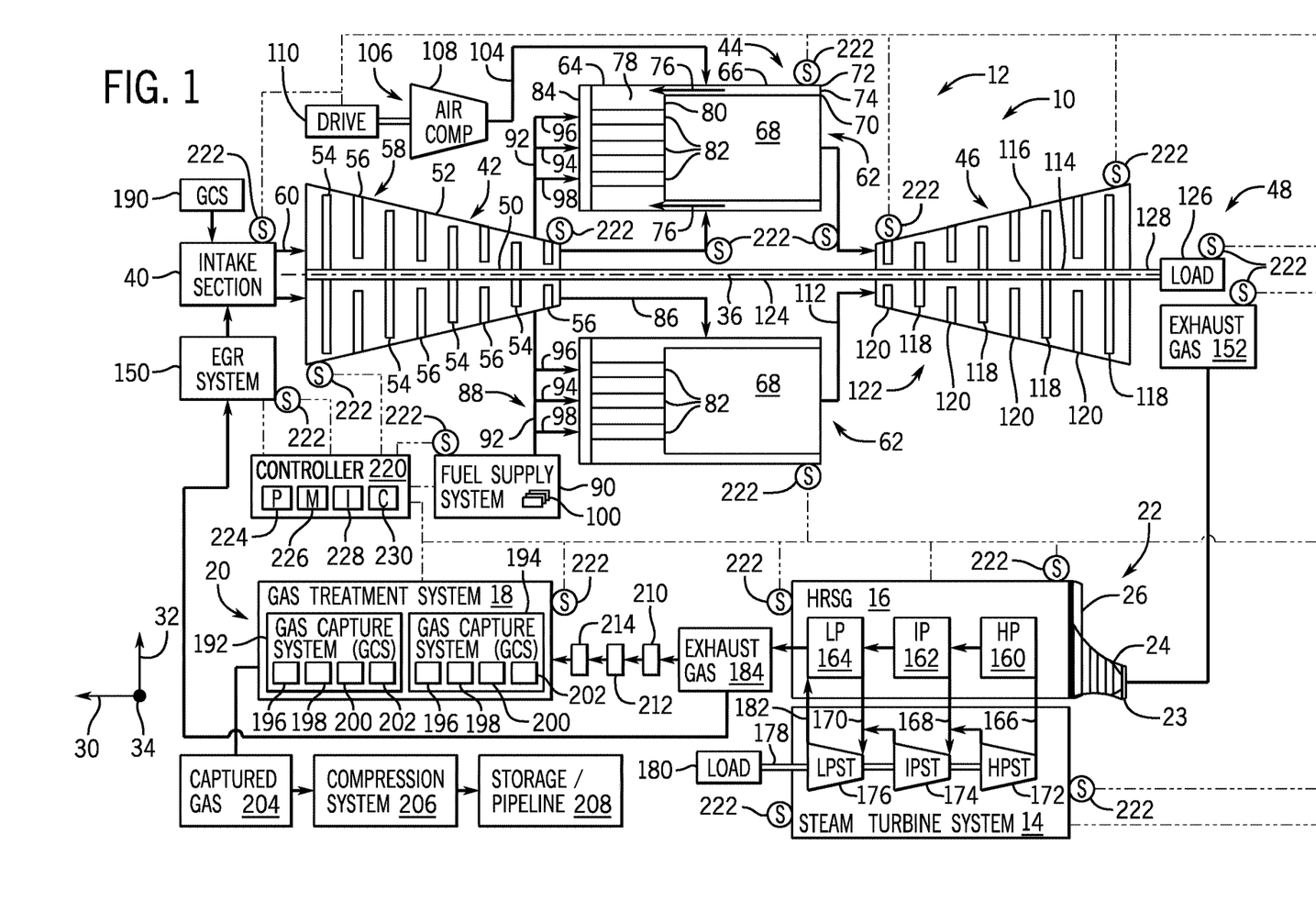
FIG. 1 is a block diagram of an embodiment of a combined cycle power plant system (hereinafter, "combined cycle system") having a gas turbine system, a steam turbine system, an HRSG, and an exhaust diffuser system between the gas turbine system and the HRSG.

FIG. 1 is a block diagram of an embodiment of a combined cycle system 10 having a gas turbine system 12, a steam turbine system 14, a heat recovery steam generator (HRSG) 16, a gas treatment system 18 having one or more gas capture systems 20, and an exhaust diffuser system 22 (e.g., inlet duct, inlet duct system, etc.). The gas capture systems 20 are configured to capture an undesirable gas (e.g., $CO_2$) from a gas, such as exhaust gas and/or air. The exhaust diffuser system 22 includes an inlet portion 23 (e.g., inlet portion), a transition portion 24 (e.g., transition portion, diffuser portion) coupled to the inlet portion 23 and a coupling portion 26 (e.g., outlet portion, plenum), wherein the inlet portion 23 is coupled to the gas turbine system 12 and the coupling portion 26 is coupled to the HRSG 16. The coupling portion 26 is configured to transition the exhaust gas 152 from the transition portion 24 to the HRSG 16.

Before discussing details of the gas treatment system 18 and the exhaust diffuser system 22, various aspects of the combined cycle system 10 are discussed in further detail. For purposes of orientation in the drawings, reference may be made to an axial direction or axis 30, a radial or vertical direction or axis 32 extending radially away from the axial direction or axis 30, and a lateral direction or axis 34 extending away from the axial direction or axis 30 and the radial or vertical direction or axis 32. The directions or axes 30, 32, and 34 may be in reference to a rotational axis 36 of the gas turbine system 12, for example. Additionally, the directions or axes 30, 32, and 34 may be in reference to a central axis of the exhaust diffuser system 22.

The gas turbine system 12 may include an intake section 40, a compressor or compressor section 42, a combustor section 44, a gas (expansion) turbine or turbine section 46, and an exhaust section 48. The compressor section 42 may include at least one shaft 50 disposed along the rotational axis 36, a casing 52 (e.g., annular casing) disposed circumferentially about the at least one shaft 50, a plurality of rotating compressor blades 54 extending radially outward from the at least one shaft 50, and a plurality of stationary compressor vanes 56 extending radially inward from the casing 52 toward the at least one shaft 50. In the illustrated embodiment, the compressor section 42 may include a plurality of compressor stages 58, each having a plurality of the compressor vanes 56 spaced circumferentially about the at least one shaft 50 at an axial position and a plurality of the compressor blades 54 spaced circumferentially about the at least one shaft 50 at a different axial position immediately adjacent to the axial position of the compressor vanes 56 (i.e., the compressor vanes 56 and the compressor blades 58 are axially spaced apart). Accordingly, the compressor section 42 is configured to receive a flow of an intake gas 60 from the intake section 40 and to progressively compress the intake gas 60 through the plurality of compressor stages 58. As discussed in further detail below, the intake gas 60 may include an intake air, an exhaust gas recirculation (EGR) flow or recirculated exhaust gas, or a combination thereof.

The combustor section 44 may include one or more combustors 62, such as a single annular combustor disposed circumferentially about the rotational axis 36 or a plurality of combustors 62 circumferentially spaced about the rotational axis 36. In the illustrated embodiment, each combustor 62 includes a head end portion 64 coupled to a combustion portion 66. In an exemplary arrangement, the combustion portion 66 includes a combustion chamber 68, a combustor liner 70 disposed circumferentially about the combustion chamber 68, a flow sleeve 72 disposed circumferentially about the combustor liner 70, and a passage 74 extending between the combustor liner 70 and the flow sleeve 72. The passage 74 is configured to route a compressed gas flow in an upstream direction 76 toward a head end chamber 78 disposed in the head end portion 64. The head end chamber 78 and the combustion chamber 68 of the combustor 62 are separated or divided from one another by an intermediate plate 80. In the head end chamber 78, a plurality of fuel nozzles 82 are coupled to the intermediate plate 80 and an end plate 84 of the head end portion 64. In operation, each combustor 62 receives a compressed gas 86 (e.g., air, EGR, etc.) from the compressor section 42, routes the compressed gas 86 along the passage 74 toward the head end chamber 78 as indicated by arrow 76, and routes the compressed gas through the fuel nozzles 82 into the combustion chamber 68.

In certain embodiments, each combustor 62 may receive one or more fuel flows from a fuel system 88 coupled to the fuel nozzles 82, wherein the fuel system 88 includes a fuel supply system 90 coupled to one or more fuel circuits 92. For example, the fuel circuits 92 may include fuel circuits 94, 96, and 98 coupled to different sets of the fuel nozzles 82. The fuel circuits 92 (e.g., 94, 96, and 98) may include fuel conduits, fuel manifolds, fuel valves, pressure regulators, and other flow controls. The fuel system 88 is configured to supply one or more fuels, such as liquid and/or gas fuels, into each of the fuel nozzles 82 for injection into the combustion chamber 68. The fuels may include natural gas, syngas generated from a gasifier, methane, hydrogen, biofuel, fuel oils, or any combination thereof. The fuel supply system 90 may include a plurality of components to control flows of the various fluids to the combustor 62. For example, the fuel supply system 90 may include one or more components 100. In certain embodiments, the components 100 may include one or more fuel tanks, fuel pumps, valves, pressure regulators, flow regulators, filters, water removal units, particulate removal units, manifolds, flow controllers, or any combination thereof.

The fuel nozzles 82 are configured to inject one or more fuels from the fuel system 88 and the compressed gas 86 from the compressor section 42. In certain embodiments, the fuel nozzles 82 are configured to inject a compressed air 104 from a compressor system 106 having an air compressor 108 coupled to a drive 110, such as an electric motor, a combustion engine, a shaft coupled to the gas turbine system 12, or another suitable drive. The compressor system 106 may be configured to receive air from ambient and/or from the intake section 40. Additionally, the compressor system 106 may be configured to enable multiple modes of operation, such as EGR mode or non-EGR mode.

For example, in certain embodiments of the gas turbine system 12 having exhaust gas recirculation (EGR), the compressor section 42 supplies the compressed gas 86 (e.g., compressed exhaust gas) to each combustor 62, while the compressor system 106 supplies the compressed air 104 to each combustor 62. By further example, in certain embodiments of the gas turbine system 12 without exhaust gas recirculation (EGR), the compressor section 42 supplies the compressed gas 86 (e.g., compressed air) to each combustor 62 without any need for additional air supplies. Thus, the compressor system 106 may optionally supply the compressed air 104 to each combustor 62. In operation, the fuel may be combusted with the air in the combustion chamber 68 of each combustor 62, thereby generating a hot combustion gas 112 for delivery from the combustion chamber 68 into the turbine section 46.

The turbine section 46 includes at least one shaft 114 disposed along the rotational axis 36, a casing 116 (e.g., annular casing) disposed circumferentially about the at least one shaft 114, a plurality of rotating turbine blades 118 extending radially outward from the at least one shaft 114, and a plurality of stationary turbine vanes 120 extending radially inward from the casing 116 toward the at least one shaft 114. The turbine section 46 may include a plurality of turbine stages 122, each having a plurality of the turbine vanes 120 spaced circumferentially about the at least one shaft 114 at an axial position, and a plurality of the turbine blades 118 spaced circumferentially about the at least one shaft 114 at a different axial position immediately adjacent the axial position of the turbine blades 118 (i.e., the turbine vanes 120 and the turbine blades 118 are axially spaced apart). The at least one shaft 114 also may be coupled to the at least one shaft 50 of the compressor section 42 via at least one intermediate shaft 124.

Additionally, the at least one shaft 114 may be coupled to a load 126 via a shaft 128. In certain embodiments, the load 126 may include an electrical generator, a machine, a propulsion system for a vehicle, or any other suitable load. In the illustrated embodiment, the load 126 may be an electrical generator, such that the combined cycle system 10 is a combined cycle power plant. In operation, the combustion gas 112 flows from the combustor 62 into the turbine section 46, wherein the combustion gas 112 progressively expands and drives rotation of the turbine blades 118 coupled to the at least one shaft 114 in each of the turbine stages 122. Thus, the combustion gas 112 drives the turbine section 46, which in turn drives the compressor section 42 and the load 126 via the interconnected shafts 50, 124, 114, and 128.

In certain embodiments, the gas turbine system 12 may be configured with a common rotational direction of the shafts 50, 114, 124, and 128 and the connected compressor blades 54 and turbine blades 118. The shafts 50, 114, 124, and 128 may be removably coupled together with shaft connections, such as flanged joints. In some embodiments, some of the shafts may be combined to reduce the number of shafts. For example, all of the illustrated shafts 50, 114 and 124 may represent a common shaft rotating in the common rotational direction, such as a clockwise or counter-clockwise rotational direction.

The gas turbine system 12 can be configured with or without the compressor system 106 and an exhaust gas recirculation (EGR) system 150. The EGR system 150 is configured to recirculate an exhaust gas 152 output by the turbine section 46 back into the compressor section 42 (e.g., via intake section 40) for compression and delivery to the combustor section 44. However, the gas turbine system 12 may exclude the EGR system 150 and intake only an airflow into the intake section 40 for compression by the compressor section 42.

In certain embodiments of the gas turbine system 12 having the EGR system 150, the recirculated exhaust gas 152 flows through the intake section 40 and each of the compressor stages 58 of the compressor section 42, thereby compressing the recirculated exhaust gas as the compressed gas 86 for delivery into combustor section 44. Additionally, the combustor section 44 may receive compressed air 104 from the air compressor 108 of the compressor system 106 through the fuel nozzles 82. The combustor section 44 also receives the fuel from the fuel system 88, such as through the fuel nozzles 82. The fuel from the fuel system 88 then combusts with the air from the compressor system 106 to generate the combustion gases 112, which then flow through the turbine section 46 to drive rotation of the turbine blades 118 in each of the turbine stages 122. The recirculated exhaust gas helps to reduce the temperature and formation of certain emissions (e.g., nitrogen oxides ($NO_x$)) associated with combustion in the combustor section 44.

In certain embodiments of the gas turbine system 12 without the EGR system 150, the compressor section 42 receives an airflow from the intake section 40, progressively compresses the airflow via the compressor stages 58, and delivers the compressed airflow as the compressed gas 86 into the combustor section 44. The compressed airflow then facilitates combustion of the fuel from the fuel system 88, thereby generating the hot combustion gases 112 for delivery to the turbine section 46. In such embodiments, the compressor system 106 may be excluded or included to provide additional compressed air 104 to the combustor section 44. Regardless of the configuration, the combustion gas 112 drives rotation of the turbine blades 118 in the turbine stages 122, thereby rotating the at least one shaft 114 coupled to the at least one shaft 50 of the compressor section 42 and the shaft 128 driving the load 126.

The exhaust gas 152 output by the turbine section 46 may then pass through the exhaust diffuser system 22 and into the HRSG 16 for transfer of heat from the exhaust gas into water to generate steam for the steam turbine system 14. Various aspects of the exhaust diffuser system 22 are discussed in detail below. In the illustrated embodiment, the HRSG 16 may include a high-pressure section 160, an intermediate-pressure section 162, and a low-pressure section 164 in a series arrangement, thereby generating a high-pressure steam 166, an intermediate-pressure steam 168 and a low-pressure steam 170. The HRSG 16 may include a plurality of components, such as economizers, evaporators, superheaters, or any combination thereof, in each of the sections 160, 162, and 164. The components of the HRSG 16 also may form tube bundles, such as heat exchanger tube bundles, for each of the sections 160, 162, and 164. The components of the HRSG 16 may be coupled together via various conduits and headers. In certain embodiments, the components of the HRSG 16 include a finishing high-pressure superheater, a secondary re-heater, a primary re-heater, a primary high-pressure superheater, an inter-stage attemperator, a high-pressure evaporator, a high-pressure economizer, an intermediate-pressure evaporator, an intermediate-pressure economizer, a low-pressure evaporator, and a low-pressure economizer.

The heat recovery steam generator 16 may route the high-pressure steam 166 to a high-pressure steam turbine 172, the intermediate-pressure steam 168 to an intermediate-pressure steam turbine 174, and the low-pressure steam 170 to a low-pressure steam turbine 176 of the steam turbine system 14. The steam drives rotation of blades within each of the steam turbines 172, 174, 176, thereby driving a shaft 178 coupled to a load 180, such as an electric generator. The low-pressure steam turbine 176 also may return a condensate 182 back to the low-pressure section 164 of the HRSG 16. The HRSG 16 may then output the exhaust gas 152 as a partially cooled exhaust gas 184, which may then pass through the gas treatment system 18.

As discussed above, the gas treatment system 18 includes one or more gas capture systems 20. For example, the gas capture systems 20 may include any one or any combination of gas capture systems 190, 192, and 194, each having a plurality of components (e.g., components 196, 198, 200, and 202). The gas capture systems 20 (e.g., 190, 192, and 194) are configured to obtain a captured gas 204 from the intake gas 60 and/or the exhaust gas 152, 184. In the illustrated embodiment, the gas capture systems 20 (e.g., 190, 192, and 194) may capture and output carbon dioxide ($CO_2$) as the captured gas 204, which may further be directed to a compression system 206. For example, the compression system 206 may include one or more compressors configured to compress the captured gas 204 (e.g., $CO_2$) and deliver the captured gas to storage and/or a pipeline 208.

The gas capture system 190 is disposed at, in, or upstream of the intake section 40 for capturing undesirable gases from the intake air. Accordingly, the gas capture system 190 may be described as a direct air capture (DAC) system. The gas capture systems 192 and 194 are disposed downstream of the gas turbine system 12 and/or the HRSG 16 for capturing undesirable gases from the exhaust gas 152, 184. The gas capture systems 20 (e.g., 190, 192, and 194) may include sorbent-based gas capture systems, solvent-based gas capture systems, cryogenic gas capture systems, or any combination thereof, configured to remove and capture undesirable gases.

In certain embodiments, the gas capture systems 20 (e.g., 190, 192, and 194) may be configured to remove and capture undesirable gases, such as carbon oxides ($CO_X$) (e.g., carbon dioxide ($CO_2$) and carbon monoxide (CO)), nitrogen oxides ($NO_X$) (e.g., nitrogen dioxide ($NO_2$)), sulfur oxides ($SO_X$) (e.g., sulfur dioxide ($SO_2$)), or any combination thereof. In the following discussion, the gas capture systems 20 (e.g., 190, 192, and 194) may be described as sorbent-based carbon capture systems using sorbent materials as an example and/or solvent-based carbon capture systems using liquid absorbents (e.g., solvents) as an example. However, the embodiments disclosed herein may use any type or configuration of gas capture systems 20 (e.g., 190, 192, and 194) as noted above.

Each of the gas capture systems 20 (e.g., 190, 192, and 194) may include components 196, 198, 200, and 202 suitable to support the type and configuration of the gas capture systems 20, such as components supporting sorbent-based gas capture systems, solvent-based gas capture systems, cryogenic gas capture systems, or any combination thereof. For example, the components 196, 198, 200, and 202 may include adsorbers having sorbent materials, solvent-based absorbers and strippers, heat exchangers, cryogenic systems, or any combination thereof. Additionally, one or more components 210, 212, and 214 may be disposed upstream from the gas capture systems 192 and 194, such as a dryer or water removal system (e.g., water gas separator), a particulate removal system (e.g., filter and/or solid gas separator), one or more booster fans, one or more coolers (e.g., a direct contact cooler (DCC)), or any combination thereof.

In certain embodiments, the exhaust gas 184 may partially or entirely bypass the gas treatment system 18 and flow to the EGR system 150, and/or the exhaust gas 184 may partially or entirely flow through the gas treatment system 18 before flowing to the EGR system 150. The EGR system 150 may include one or more conduits, valves, flow controls, coolers, blowers, or any combination thereof, configured to provide at least a portion of the exhaust gas 152, 184 (e.g., EGR flow) to the intake section 40 for recirculation through the compressor section 42. The cooler may be configured to cool the exhaust gas 152, 184 to a lower temperature (e.g., approximately ambient temperature) prior to recirculation into the compressor section 42. The blower may be configured to increase a pressure and flow of the exhaust gas 152, 184 to help overcome pressure losses in the EGR system 150.

In the illustrated embodiment, the combined cycle system 10 also includes a controller 220 coupled to the gas turbine system 12, the steam turbine system 14, the HRSG 16, the gas treatment system 18, the fuel system 88, the EGR system 150, the compression system 106, and various sensors 222 distributed throughout the combined cycle system 10. In the illustrated embodiment, the controller 220 includes one or more processors 224, memory 226, instructions 228 stored on the memory 226 and executable by the processor 224, and communication circuitry 230 configured to communicate with the sensors 222 and various equipment throughout the combined cycle system 10. For example, the controller 220 is configured to control the fuel delivery and distribution from the fuel system 88 to the fuel nozzles 82 in the combustor section 44. In certain embodiments, the controller 220 is configured to control operation of the gas capture systems 20 (e.g., 190, 192, and 194), such by controlling modes of operation (e.g., adsorption mode and desorption mode), controlling flows of various fluids through the gas capture systems 20, or any combination thereof.

The sensors 222 (designated with an "S") are configured to monitor various operational parameters of the combined cycle system 10. In certain embodiments, the sensors 222 include temperature sensors, pressure sensors, flow rate sensors, fluid composition sensors (e.g., gas composition sensors), vibration sensors, clearance sensors, speed sensors, humidity and/or moisture sensors, or any combination thereof. The sensors 222 may monitor the parameters (e.g., temperature, pressure, flow rate, and fluid composition) at one or more locations of the compressor section 42, the combustor section 44, the turbine section 46, the gas treatment system 18, or any combination thereof. For example, the sensors 222 may monitor compressor parameters (e.g., pressure ratio between the inlet and outlet of the compressor section 42), combustion gas parameters (e.g., firing temperature and combustion dynamics), turbine parameters (e.g., temperature and pressure at each turbine stage, the turbine inlet, and the turbine exhaust), and exhaust gas emissions. By further example, the exhaust gas emissions monitored by the sensors 222 may include carbon oxides ($CO_X$) such as carbon dioxide ($CO_2$) and carbon monoxide (CO), nitrogen oxides ($NO_X$) such as nitrogen dioxide ($NO_2$), sulfur oxides ($SO_X$) such as sulfur dioxide ($SO_2$), unburnt hydrocarbons, particulate matter, and other undesirable exhaust emissions. By further example, the sensors 222 may monitor the temperature of the sorbent materials in sorbent-based gas capture systems, the temperature of solvent in solvent-based gas capture systems, or any combination thereof. In response to the feedback from the sensors 222, the controller 220 may adjust the operating mode, fluid flows, heating, cooling, or any combination thereof, in the gas capture systems 20.

As discussed above, the combined cycle system 10 includes the exhaust diffuser system 22 disposed between the gas turbine system 12 and the HRSG 16. Although the transition portion 24 is shown schematically separate from the gas turbine system 12, the transition portion 24 may be mounted to the gas turbine system 12 at the turbine section 46. For example, the transition portion 24 may be directly or indirectly mounted to an aft frame of the gas turbine system 12 coaxial with a rotational axis of the turbine section 46.

Figure 2:
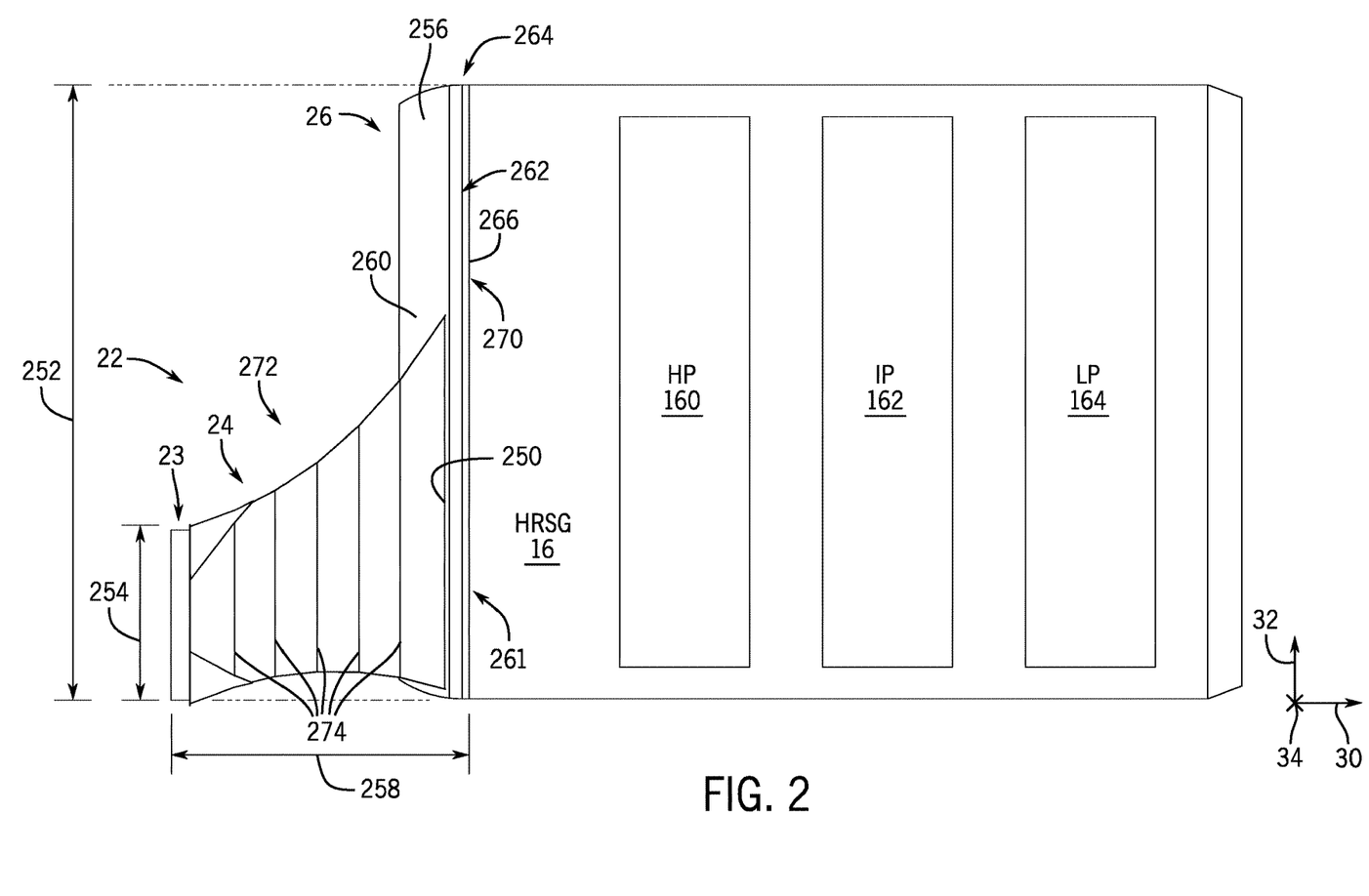
FIG. 2 is a side view of an embodiment of the exhaust diffuser system coupled to the HRSG of FIG. 1, illustrating aspects of the exhaust diffuser system that help transition an exhaust flow into the HRSG.

FIG. 2 is a side view of an embodiment of the HRSG 16 of FIG. 1, illustrating an embodiment of the exhaust diffuser system 22 of the HRSG 16. In the illustrated embodiment, the HRSG 16 includes sections 160, 162, and 164, although it should be recognized that the HRSG 16 may include any number of sections. For example, the HRSG 16 may include 1, 2, 3, 4, 5, 6, 7, 8, 9, or 10 sections. In the illustrated embodiment, the HRSG 16 is shown as extending in the axial direction 30. That is, the sections 160, 162, and 164 of the HRSG 16 are axially positioned in a horizontal orientation.

As shown, the exhaust diffuser system 22 includes the inlet portion 23, the transition portion 24 (e.g., diffuser portion, diffuser duct, transition portion) axially extending from the inlet portion 23 (e.g., inlet portion), and the coupling portion 26 (e.g., outlet portion, plenum) fluidly coupled to an axial distal end 250 of the transition portion 24. As shown, an outlet extent 252 (e.g., outlet vertical extent, plenum extent) of the coupling portion 26 is greater than an inlet extent 254 (e.g., inlet vertical extent) of the inlet portion 23.

In the illustrated embodiment, the coupling portion 26 includes a curved wall 256 extending crosswise to an axial extent 258 of the exhaust diffuser system 22. For example, the curved wall 256 may have a U-shaped cross-section (e.g., semi-circular cross-section) extending in the radial or vertical direction 32. In certain embodiments, the curved wall 256 may be a semi-cylindrical wall or a frustoconical wall extending in the radial or vertical direction 32. The curved wall 256 may add stiffness or structural support to the coupling portion 26 and to the entire exhaust diffuser system 22. The transition portion 24 is coupled to a convex side 260 of the curved wall 256. In the illustrated embodiment, the transition portion 24 is coupled to a bottom portion 261 of the curved wall 256. In certain embodiments, the transition portion 24 may be coupled to a middle portion or a top portion of the curved wall 256.

In the illustrated embodiment, the exhaust diffuser system 22 is coupled to a lateral side 262 of the HRSG 16 via the coupling portion 26. As shown, an interface 264 formed at a longitudinal distal end 266 of the coupling portion 26 is configured to engage (e.g., interface with) the lateral side 262 of the HRSG 16. That is, a perimeter of the interface 264 is configured to couple to a perimeter of the lateral side 262 of the HRSG 16. In the illustrated embodiment, a concave side 270 of the curved wall 256 is configured to be fluidly coupled to the HRSG 16 via the engagement between the interface 264 of the coupling portion 26 and the lateral side 262. In other embodiments, the HRSG 16 may extend in the vertical direction 32 (e.g., vertical configuration), such that the sections 160, 162, and 164 of the HRSG 16 are vertically stacked. In certain embodiments, the exhaust diffuser system 22 may couple to a top side or a bottom side of an HRSG 16 having a vertical configuration.

As discussed in further detail herein, the transition portion 24 includes a plurality of wall portions 272 (e.g., plates) that are incrementally angled relative to the axial extent 258 extending from the inlet portion 23 to the coupling portion 26. In certain embodiments, the wall portions 272 may include flat plates, panels, or sheets (e.g., metal sheets), such that each of the wall portions 272 has a constant angle along a width of the respective wall portion 272, and the wall portions 272 are incrementally angled with one constant angle after another. In certain embodiments, the wall portions 272 may include curved plates, panels, or sheets (e.g., metal sheets), such that each of the wall portions 272 has a curvature in the direction 30, 32, and/or 34, and the angle of each of the wall portions 272 may be variable. For example, each of the wall portions 272 may be slightly curved with a radius equal to or greater than (e.g., 1, 1.1, 1.2, 1.3, 1.5, 2, or 3 times) a height and/or width of the transition portion 24 at a position of each respective wall portion 272.

In the illustrated embodiment, consecutive wall portions 272 are coupled at boundaries 274. In certain embodiments, consecutive wall portions 272 may be separate plates (e.g., sheets) coupled via welding (e.g., welded joints) or a plurality of mechanical fasteners (e.g., rivets, screws). That is, the boundaries 274 may include weld lines and/or an overlapping of consecutive wall portions 272. In other embodiments, the plurality of wall portions 272 may be formed into a single plate via a bending of the plate at the boundaries 274. That is, in certain embodiments, the boundaries 274 between consecutive wall portions 272 may include a bend (e.g., crease and change in angle) in a material. It should be recognized that the boundaries 274 provide a self-reinforcing (e.g., self-stiffening) functionality to the plurality of wall portions 272. This self-reinforcing functionality of the boundaries 274 may be used in conjunction with external support structures or, in certain embodiments, may completely replace external support structures that would otherwise be needed to support the exhaust diffuser system 22.

In certain embodiments, the transition portion 24 be formed by rolling (e.g., roll bending) a single wall portion 272 to form a continuously curved shape without discrete (e.g., stepwise) changes in angles. In certain embodiments, the transition portion 24 may include a plurality of wall portions 272 with at least one of the wall portions 272 having a gradually-curved shaped formed via rolling. The process of rolling the at least one of the wall portions 272 may include feeding the at least one wall portion 272, which may be composed of a metal, into a three-roller roll-bender machine.

Figure 3:
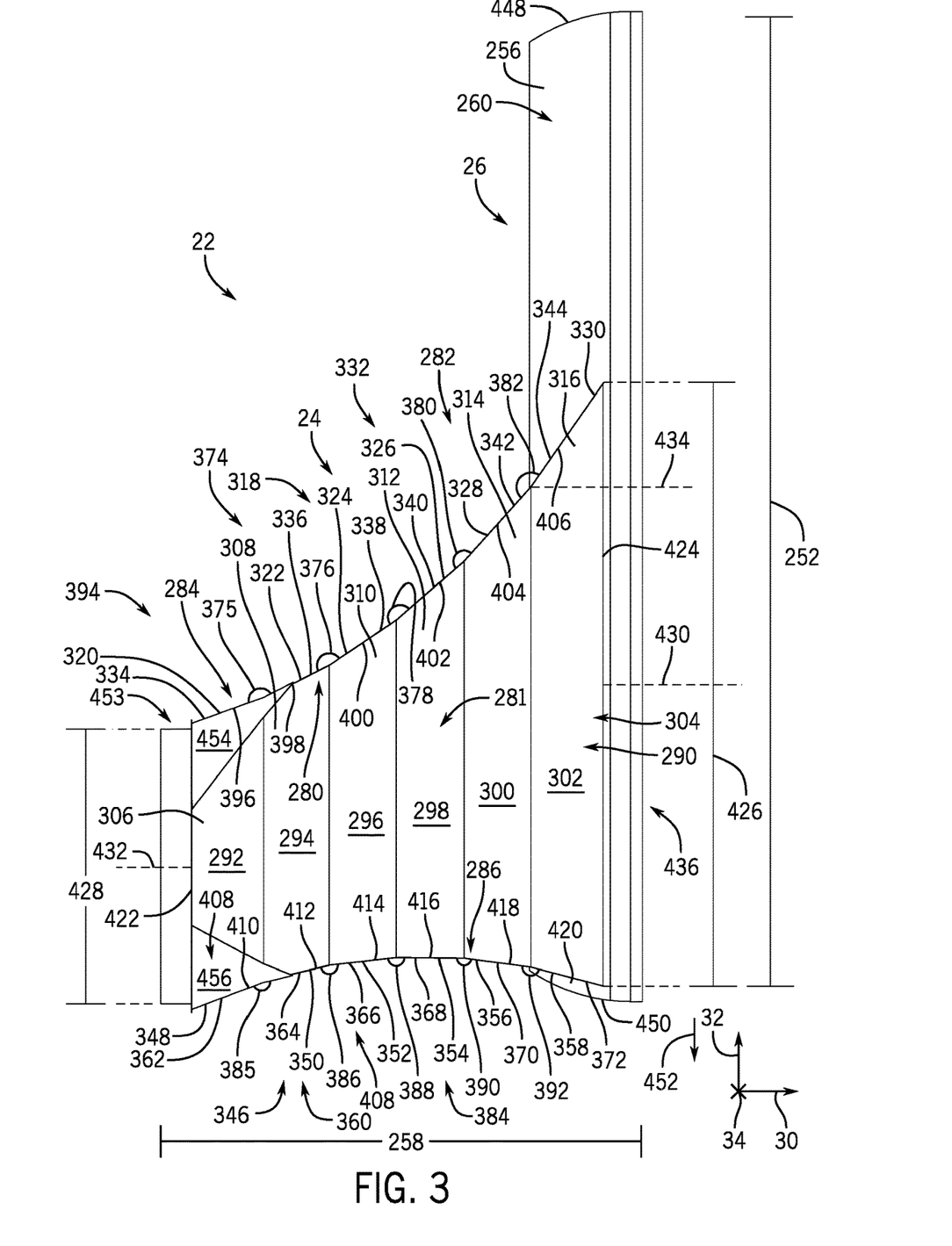
FIG. 3 is a side view of an embodiment of the exhaust diffuser system of FIG. 2, illustrating aspects of a transition portion and a coupling portion of the exhaust diffuser system.

FIG. 3 is a side view of an embodiment of the exhaust diffuser system 22 of FIG. 2, illustrating an embodiment of the transition portion 24 of the exhaust diffuser system 22 and an embodiment of the coupling portion 26 of the exhaust diffuser system 22. In the illustrated embodiment, the transition portion 24 includes side walls 280. In the illustrated embodiment and as seen more clearly in FIGS. 5 and 6, the side walls 280 include a first side wall 281 (e.g., first lateral side), a second side wall 282 (e.g., top side), a third side wall 284 (e.g., second lateral side), and a fourth side wall 286 (e.g., bottom side). In certain embodiments, the transition portion 24 may include fewer or more sides. For example, the transition portion 24 may include 3, 5, 6, 7, 8, or more sides.

In the illustrated embodiment, the first side wall 281, the second side wall 282, and the fourth side wall 286 each include the wall portions 272. In certain embodiments, the third side wall 284 also includes wall portions 272. As shown, the wall portions 272 include a plurality of first wall portions 290 (e.g., first wall portions 292, 294, 296, 298, 300, and 302) that form the first side wall 281 of the transition portion 24. The first wall portions 290 include first exterior surfaces 304 (e.g., first exterior surfaces 306, 308, 310, 312, 314, and 316). Although the illustrated embodiment shows the first side wall 281 as having six first wall portions 290, the first side wall 281 may include fewer or more first wall portions 290. For example, the first side wall 281 may include 3, 4, 5, 6, 7, 8, 9, 10, 11, 12, 14, 16, 18, 20, or more first wall portions 290 and corresponding first exterior surfaces 304. In certain embodiments, the first side wall 281 may include four or more first wall portions 290. Additionally, any combination of the first wall portions 290 may be equivalent to each other in the longitudinal extent (e.g., equal dimensions) relative to the axial direction 30. However, in some embodiments, the first wall portions 290 may have different dimensions in the axial direction 30.

In the illustrated embodiment, the wall portions 272 additionally include second wall portions 318 (e.g., second wall portions 320, 322, 324, 326, 328, and 330) that form the second side wall 282 of the transition portion 24. The second wall portions 318 include second exterior surfaces 332 (e.g., second exterior surfaces 334, 336, 338, 340, 342, and 344). Although the illustrated embodiment shows the second side wall 282 as having six second wall portions 318, the second side wall 282 may include fewer or more second wall portions 318. For example, the second side wall 282 may include 3, 4, 5, 6, 7, 8, 9, 10, 11, 12, 14, 16, 18, 20, or more second wall portions 318 and corresponding second exterior surfaces 332. In certain embodiments, the second side wall 282 may include four or more second wall portions 318. Additionally, any combination of the second wall portions 318 may be equivalent to each other in the longitudinal extent (e.g., equal dimensions) relative to the axial direction 30. However, in some embodiments, the second wall portions 318 may have different dimensions in the axial direction 30.

In the illustrated embodiment, the wall portions 272 additionally include fourth wall portions 346 (e.g., fourth wall portions 348, 350, 352, 354, 356, and 358) that form the fourth side wall 286 of the transition portion 24. The fourth wall portions 346 include fourth exterior surfaces 360 (e.g., fourth exterior surfaces 362, 364, 366, 368, 370, and 372). Although the illustrated embodiment shows the fourth side wall 286 as having six fourth wall portions 346, the fourth side wall 286 may include fewer or more fourth wall portions 346. For example, the fourth side wall 286 may include 3, 4, 5, 6, 7, 8, 9, 10, 11, 12, 14, 16, 18, 20, or more fourth wall portions 346 and corresponding fourth exterior surfaces 360. In certain embodiments, the fourth side wall 286 may include four or more fourth wall portions 346. Additionally, any combination of the fourth wall portions 346 may be equivalent to each other in the longitudinal extent (e.g., equal dimensions) relative to the axial direction 30. However, in some embodiments, the fourth wall portions 346 may have different dimensions in the axial direction 30. The wall portions 272 may additionally include third wall portions that form the third side wall 284 and corresponding third exterior surfaces, which are described in further detail herein.

In the illustrated embodiment, the second wall portions 318 of the second side wall 282 are incrementally angled relative to consecutive second wall portions 318, such that consecutive second wall portions 318 are angled by second angles 374 (e.g., second angles 375, 376, 378, 380, and 382), each second angle 374 spanning adjacent second exterior surfaces 332 of consecutive second wall portions 318. In certain embodiments, each of the second angles 374 are between 150 and 179 degrees, 165 and 178 degrees, or 168 and 175 degrees. In certain embodiments, any combination of the second angles 374 may be equivalent to each other. In certain embodiments, in a direction of exhaust gas flow through the exhaust diffuser system 22, each consecutive second wall portion 318 changes by an angle of less than or equal to 2, 3, 4, 5, 6, 7, 8, 9, or 10 degrees (e.g., 2 to 10 degrees or 3 to 7 degrees) relative to an immediately preceding second wall portion 318, thereby helping to reduce the risk of flow separation of the exhaust gas flow along the second side wall 282. In certain embodiments, in the direction of exhaust gas flow through the exhaust diffuser system 22, the second wall portions 318 are gradually and progressively angled upwardly as the transition portion 24 extends from the inlet portion 23 to the coupling portion 26. Collectively, the upwardly angled second wall portions 318 of the fourth side wall 286 may define a concave up, increasing slope of the second side wall 282.

In the illustrated embodiment, the fourth wall portions 346 of the fourth side wall 286 are incrementally angled relative to consecutive fourth wall portions 346, such that consecutive fourth wall portions 346 are angled by fourth angles 384 (e.g., fourth angles 385, 386, 388, 390, and 392), each fourth angle 384 spanning adjacent fourth exterior surfaces 360 of consecutive fourth wall portions 346. In certain embodiments, each of the fourth angles 384 are between 150 and 179 degrees, 165 and 178 degrees, or 168 and 175 degrees. In certain embodiments, any combination of the fourth angles 384 may be equivalent to each other. Additionally, or alternatively, any combination of the fourth angles 384 may be equivalent to any combination of the second angles 374 described herein. In certain embodiments, in a direction of exhaust gas flow through the exhaust diffuser system 22, each consecutive fourth wall portion 346 changes by an angle of less than or equal to 2, 3, 4, 5, 6, 7, 8, 9, or 10 degrees (e.g., 2 to 10 degrees or 3 to 7 degrees) relative to an immediately preceding fourth wall portion 346, thereby helping to reduce the risk of flow separation of the exhaust gas flow along the fourth side wall 286. In certain embodiments, in the direction of exhaust gas flow through the exhaust diffuser system 22, the fourth wall portions 346 are gradually and progressively angled upwardly (e.g., defining an upwardly angled portion of the fourth side wall 286) and then gradually and progressively angled downward (e.g., defining a downwardly angled portion of the fourth side wall 286) as the transition portion 24 extends from the inlet portion 23 to the coupling portion 26. Collectively, the upwardly angled portion and the downwardly angled portion of the fourth side wall 286 may define a concave down geometry of the fourth side wall 286. The upwardly angled portion of the fourth side wall 286 is configured to help direct the exhaust flow upwardly against the second side wall 282, thereby further helping to avoid or reduce the risk of flow separation along the second side wall 282.

In certain embodiments, the first side wall 281, the third side wall 284, and/or the fourth side wall 286 of the transition portion 24 may include a single wall portion, as opposed to pluralities of wall portions. That is, in certain embodiments, the first side wall 281, the third side wall 284, and/or fourth side wall 286 may not gradually expand and/or may not gradually change via wall portions. As discussed herein, the incrementally angled wall portions 272 provide for a gradual expansion of the transition portion 24. This gradual expansion of the angled wall portions 272 reduces the likelihood of flow detachments from the interior surface of the transition portion 24. In certain embodiments, the gradual expansion of the side walls 280 via the gradual angling of the wall portions 272 is applied to at least the second (top) side wall 282.

In the illustrated embodiment, the first wall portions 290 are coupled to the second wall portions 318 to form a plurality of first edges 394 (e.g., first edges 396, 398, 400, 402, 404, and 406) that couples the first side wall 281 of the transition portion 24 to the second side wall 282 of the transition portion 24. That is, the first wall portions 292, 294, 296, 298, 300, and 302 are coupled to the second wall portions 320, 322, 324, 326, 328, and 330 via the first edges 396, 398, 400, 402, 404, and 406, respectively. Additionally, the first wall portions 290 are coupled to the fourth wall portions 346 to form a plurality of fourth edges 408 (e.g., fourth edges 410, 412, 414, 416, 418, and 420) that couple the first side wall 281 of the transition portion 24 to the fourth side wall 286 of the transition portion 24. That is, the first wall portions 292, 294, 296, 298, 300, and 302 are coupled to the fourth wall portions 348, 350, 352, 354, 356, and 358 via the fourth edges 410, 412, 414, 416, 418, and 420, respectively.

In the illustrated embodiment, the transition portion 24 includes an inlet side 422 that couples to the inlet portion 23 of the exhaust diffuser system 22. Additionally, the transition portion 24 includes an outlet side 424 that couples to the coupling portion 26 of the exhaust diffuser system 22. In the illustrated embodiment, a first extent 426 (e.g., vertical extent) of the outlet side 424 is greater than a second extent 428 (e.g., vertical extent) of the inlet side 422. Additionally, a first central axis 430 orthogonal to the first extent 426 is offset in the direction 32 relative to a second central axis 432 orthogonal to the second extent 428. In the illustrated embodiment, the first central axis 430 is vertically higher than the second central axis 432. That is, the first side wall 281 and the third side wall 284 are not symmetrical about a plane through axes 30 and 34 (e.g., a horizontal plane). Similarly, the second (top) side wall 282 and the fourth (bottom) side wall 286 are not symmetrical about the plane through axes 30 and 34 (e.g., horizontal plane). In certain embodiments, the first central axis 430 may be vertically lower than the second central axis 432 or, in certain embodiments, at the same vertical height as the second central axis 432.

In the illustrated embodiment, the first extent 426 of the outlet side 424 of the transition portion 24 is smaller than the outlet extent 252 of the coupling portion 26. In certain embodiments, the first extent 426 may be less than or equal to the outlet extent 252. For example, the first extent 426 may be less than 10, 25, 50, 75, or 100 percent of the outlet extent 252. As discussed herein, the first central axis 430 of the first extent 426 is offset from a coupling central axis 434 of the coupling portion 26. In the illustrated embodiment, the first central axis 430 is lower than the coupling central axis 434. That is, the outlet side 424 of the transition portion 24 is coupled to a lower portion 436 of the coupling portion 26. In certain embodiments, the first central axis 430 may be aligned with the coupling central axis 434 or, in certain embodiments, higher than the coupling central axis 434.

In the illustrated embodiment, the coupling portion 26 includes the curved wall 256 that extends crosswise to the axial extent 258 of the exhaust diffuser system 22. As shown, the transition portion 24 is coupled to the convex side 260 of the curved wall 256. The outlet extent 252 of the coupling portion 26 extends crosswise to the coupling central axis 434. In the illustrated embodiment, the coupling portion 26 includes a first lateral wall 448 (e.g., top wall) coupled to the curved wall 256, disposed in the direction 32 away from the coupling central axis 434, and extending crosswise from the curved wall 256. The coupling portion 26 also includes a second lateral wall 450 (e.g., bottom wall) coupled to the curved wall 256, disposed in the direction 452 away from the coupling central axis 434, and extending crosswise form the curved wall 256. As shown, the first lateral wall 448 and the second lateral wall 450 are convexly curved relative to the coupling central axis 434.

In the illustrated embodiment, the transition portion 24 includes diagonal portions 453, which include a first diagonal surface 454 disposed adjacent to the inlet portion 23 and along the plurality of first edges 394. In the illustrated embodiment, the first diagonal surface 454 longitudinally intersects the first wall portions 292 and 294, and second wall portions 320 and 322. In certain embodiments, the first diagonal surface 454 may intersect more or fewer first wall portions 290 and/or more or fewer second wall portions 318. Additionally, the transition portion 24 includes a fourth diagonal surface 456 disposed adjacent to the inlet portion 23 and along the plurality of fourth edges 408. In the illustrated embodiment, the fourth diagonal surface 456 longitudinally intersects the first wall portions 292 and 294, and fourth wall portions 348 and 350. In certain embodiments, the fourth diagonal surface 456 may intersect more or fewer first wall portions 290 and/or more or fewer fourth wall portions 346.

Figure 4:
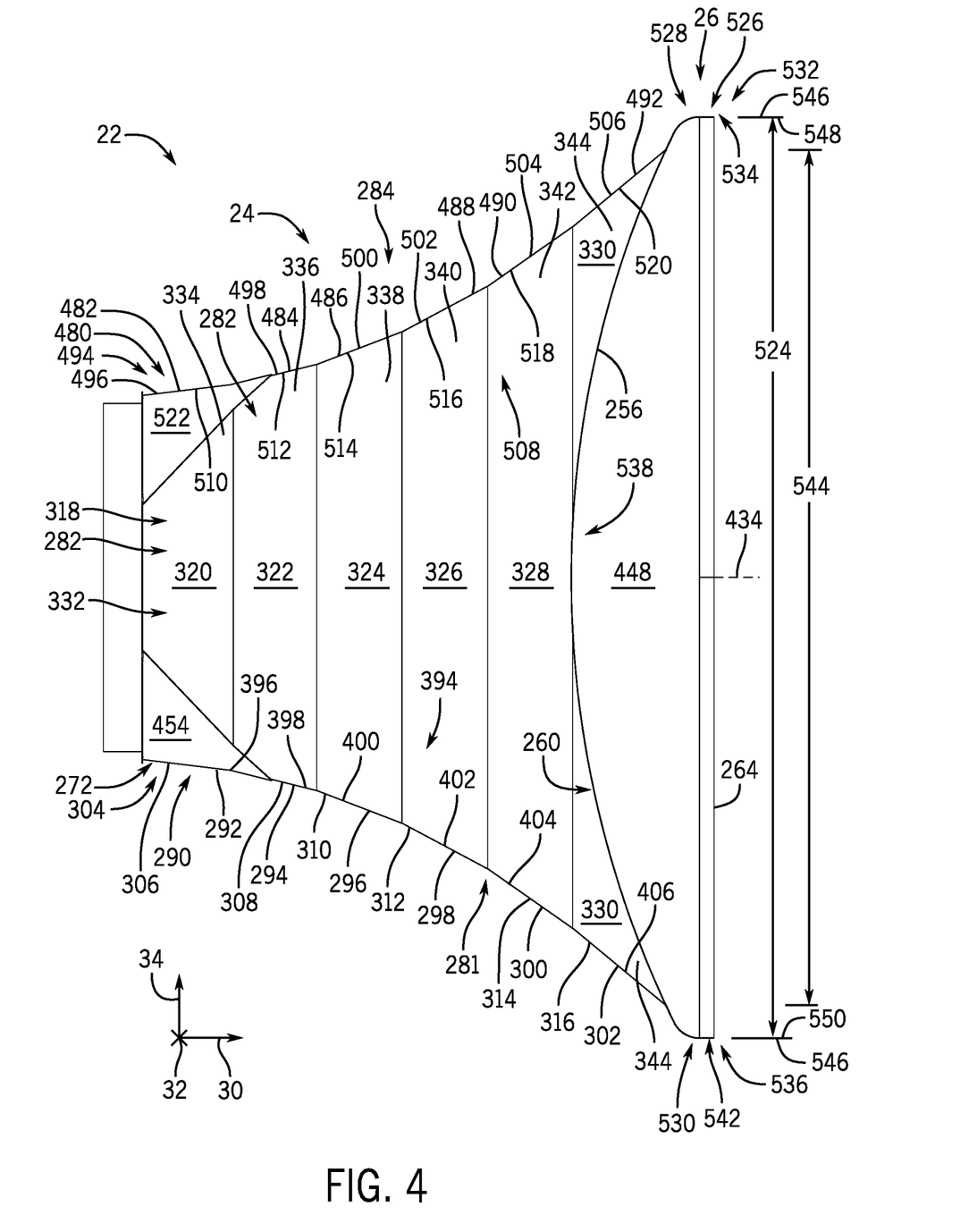
FIG. 4 is a top view of an embodiment of the exhaust diffuser system of FIG. 2, illustrating aspects of the transition portion and the coupling portion of the exhaust diffuser system.

FIG. 4 is a top view of an embodiment of the exhaust diffuser system 22 of FIG. 2, illustrating an embodiment of the transition portion 24 of the exhaust diffuser system 22 and an embodiment of the coupling portion 26 of the exhaust diffuser system 22. In the illustrated embodiment, the wall portions 272 include the plurality of second wall portions 318 (e.g., second wall portions 320, 322, 324, 326, 328, and 330) that form the second side 282 of the transition portion 24. The second wall portions 318 include second exterior surfaces 332 (e.g., second exterior surfaces 334, 336, 338, 340, 342, and 344). Although the illustrated embodiment shows the second side wall 282 as having six second wall portions 318, the second side wall 282 may include fewer or more second wall portions 318. For example, the second side wall 282 may include 3, 4, 5, 6, 7, 8, 9, 10, 11, 12, 14, 16, 18, 20, or more second wall portions 318 and corresponding second exterior surfaces 332. In certain embodiments, the second side wall 282 may include four or more second wall portions 318.

In the illustrated embodiment, the wall portions 272 include a plurality of first wall portions 290 (e.g., first wall portions 292, 294, 296, 298, 300, and 302) that form the first side wall 281 of the transition portion 24. The first wall portions 290 include first exterior surfaces 304 (e.g., first exterior surfaces 306, 308, 310, 312, 314, and 316). Although the illustrated embodiment shows the first side wall 281 as having six first wall portions 290, the first side wall 281 may include fewer or more first wall portions 290. For example, the first side wall 281 may include 3, 4, 5, 6, 7, 8, 9, 10, 11, 12, 14, 16, 18, 20, or more first wall portions 290 and corresponding first exterior surfaces 304. In certain embodiments, the first side wall 281 may include four or more first wall portions 290. Additionally, any combination of the first wall portions 290 may be equivalent to each other in the longitudinal extent (e.g., equal dimensions) relative to the axial direction 30. However, in some embodiments, the first wall portions 290 may have different dimensions in the axial direction 30.

In certain embodiments, in a direction of exhaust gas flow through the exhaust diffuser system 22, each consecutive first wall portion 290 of the first side wall 281 changes by an angle of less than or equal to 2, 3, 4, 5, 6, 7, 8, 9, or 10 degrees (e.g., 2 to 10 degrees or 3 to 7 degrees) relative to an immediately preceding first wall portion 290, thereby helping to reduce the risk of flow separation of the exhaust gas flow along the first side wall 281. In certain embodiments, in the direction of exhaust gas flow through the exhaust diffuser system 22, the first wall portions 290 are gradually and progressively angled outwardly relative to the central axis (e.g., central axis 434) as the transition portion 24 extends from the inlet portion 23 to the coupling portion 26. Collectively, the outwardly angled first wall portions 290 of the first side wall 281 may define a concave up (i.e., away from the central axis 434), increasing slope of the first side wall 281.

In the illustrated embodiment, the wall portions 272 include a plurality of third wall portions 480 (e.g., third wall portions 482, 484, 486, 488, 490, and 492) that form the third side wall 284 of the transition portion 24. The third wall portions 480 include third exterior surfaces 494 (e.g., third exterior surfaces 496, 498, 500, 502, 504, and 506). Although the illustrated embodiment shows the third side wall 284 as having six third wall portions 480, the third side wall 284 may include fewer or more third wall portions 480. For example, the third side wall 284 may include 3, 4, 5, 6, 7, 8, 9, 10, 11, 12, 14, 16, 18, 20, or more third wall portions 480 and corresponding third exterior surfaces 494. In certain embodiments, the third side wall 284 may include four or more third wall portions 480. Additionally, any combination of the third wall portions 480 may be equivalent to each other in the longitudinal extent (e.g., equal dimensions) relative to the axial direction 30. However, in some embodiments, the third wall portions 480 may have different dimensions in the axial direction 30.

In certain embodiments, in a direction of exhaust gas flow through the exhaust diffuser system 22, each consecutive third wall portion 480 of the third side wall 284 changes by an angle of less than or equal to 2, 3, 4, 5, 6, 7, 8, 9, or 10 degrees (e.g., 2 to 10 degrees or 3 to 7 degrees) relative to an immediately preceding third wall portion 480, thereby helping to reduce the risk of flow separation of the exhaust gas flow along the third side wall 284. In certain embodiments, in the direction of exhaust gas flow through the exhaust diffuser system 22, the third wall portions 480 are gradually and progressively angled outwardly relative to the central axis (e.g., central axis 434) as the transition portion 24 extends from the inlet portion 23 to the coupling portion 26. Collectively, the outwardly angled third wall portions 480 of the third side wall 284 may define a concave up (i.e., away from the central axis 434), increasing slope of the third side wall 284.

Each of the first side wall 281, the second side wall 282, the third side wall 284, and the fourth side wall 286 includes the same number of wall portions 272 (i.e., first wall portions 290, second wall portions 318, third wall portions 480, and fourth wall portions 346). As illustrated in the exemplary embodiments, each side wall 281, 282, 284, 286 includes six wall portions 272, although each side wall may instead include 3, 4, 5, 7, 8, 9, 10, 11, 12, 14, 16, 18, 20, or more wall portions 272.

As discussed herein, the first wall portions 290 are coupled to the second wall portions 318 to form the plurality of first edges 394 (e.g., first edges 396, 398, 400, 402, 404, and 406) that couple the first side wall 281 of the transition portion 24 to the second side wall 282 of the transition portion 24. That is, the first wall portions 292, 294, 296, 298, 300, and 302 are coupled to the second wall portions 320, 322, 324, 326, 328, and 330 via the first edges 396, 398, 400, 402, 404, and 406, respectively. In the illustrated embodiment, the second wall portions 318 are coupled to the third wall portions 480 to form a plurality of second edges 508 (e.g., second edges 510, 512, 514, 516, 518, and 520) that couples the second side wall 282 of the transition portion 24 to the third side wall 284 of the transition portion 24. That is, the second wall portions 320, 322, 324, 326, 328, and 330 are coupled to the third wall portions 482, 484, 486, 488, 490, and 492 via the second edges 510, 512, 514, 516, 518, and 520, respectively.

In the illustrated embodiment, the transition portion 24 includes diagonal portions 453, which include a first diagonal surface 454 disposed adjacent to the inlet portion 23 and along the plurality of first edges 394. As discussed herein, the first diagonal surface 454 longitudinally intersects the first wall portions 292 and 294, as well as the second wall portions 320 and 322. In certain embodiments, the first diagonal surface 454 may intersect more or fewer first wall portions 290 and/or more or fewer second wall portions 318. In the illustrated embodiment, the transition portion 24 includes a second diagonal surface 522 disposed adjacent to the inlet portion 23 and along the plurality of second edges 508. In the illustrated embodiment, the second diagonal surface 522 longitudinally intersects the second wall portions 320 and 322, and the third wall portions 496 and 498. In certain embodiments, the second diagonal surface 522 may intersect more or fewer second wall portions 318 and/or more or fewer third wall portions 480.

As discussed herein, the coupling portion 26 includes the curved wall 256 that extends transverse to the axial extent 258 (FIG. 3). As shown, the transition portion 24 is coupled to the convex side 260 of the curved wall 256. A second lateral extent 524 of the coupling portion 26 extends crosswise to the coupling central axis 434, as well as the first lateral extent of the coupling portion 26. In certain embodiments, the outlet extent 252 of the coupling portion 26 (e.g., shown in FIG. 3) and the second lateral extent 524 may be the same or different from one another. Although the outlet extent 252 may be larger than the second lateral extent 524 with reference to FIGS. 3 and 4, any suitable ratio (e.g., aspect ratio) of the outlet extent 252 and the second lateral extent 524 of the coupling portion 26 may be used, so as to engage HRSGs of various shapes and sizes. For example, the outlet extent 252 may be smaller than the second lateral extent 524. In the illustrated embodiment, the coupling portion 26 includes the first lateral wall 448 coupled to the curved wall 256, disposed in the direction 32 away from the coupling central axis 434, and extending crosswise from the curved wall 256.

In the illustrated embodiment, the curved wall 256 includes curved ends 526 (e.g., curved ends 528, 530) disposed at lateral end portions 532 (e.g., lateral end portions 534, 536) of the second lateral extent 524. The curved ends 526 are more sharply curved (e.g., smaller radius) than a middle portion 538 (e.g., larger radius) of the curved wall 256, and provide a transition from the middle portion 538 to the interface 264 (e.g., lip, interface, etc.) disposed at a longitudinal distal end 542 of the coupling portion 26. That is, a curvature associated with the curved wall 256 increases at the curved ends 526 at positions 544 along the second lateral extent 524 of the coupling portion 26. In certain embodiments, the positions 544 are less than 1, 2, 3, 4, 5, 8, 10, 15, or 20 percent of a total length of the second lateral extent 524 away from lateral distal ends 546 (e.g., lateral distal ends 548, 550) of the second lateral extent 524. In certain embodiments, the radius of the middle portion 538 of the curved wall 256 may be at least equal to or greater than the second lateral extent 524, or in a range of approximately 0.7 to 2 times the second lateral extent 524. In certain embodiments, the radius of the middle portion 538 may be constant or variable in the vertical direction 32. As noted above, the curvature of the curved wall 256 is configured to add stiffness and structural support to the exhaust diffuser system 22, while also helping with the exhaust gas expansion from the transition portion 24 through the coupling portion 26 into the HRSG 16.

Figure 5:
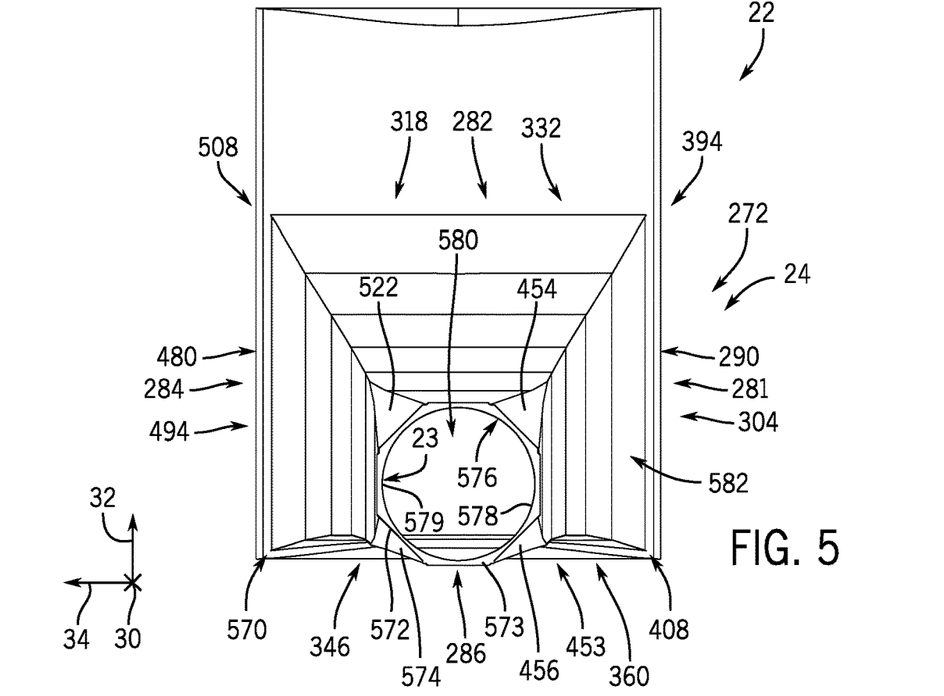
FIG. 5 is a front view of an embodiment of the exhaust diffuser system of FIG. 2, illustrating aspects of the transition portion of the exhaust diffuser system having a plurality of incrementally angled flat wall portions.

FIG. 5 is a front view of an embodiment of the exhaust diffuser system 22 of FIG. 2, illustrating an embodiment of the transition portion 24 of the exhaust diffuser system 22 having the plurality of incrementally angled wall portions 272. In the illustrated embodiment, the transition portion 24 includes the first side wall 281, the second side wall 282, the third side wall 284, and the fourth side wall 286, as discussed herein. The transition portion 24 also includes the plurality of first edges 394, the plurality of second edges 508, and the plurality of fourth edges 408, as discussed herein. Additionally, the transition portion 24 includes a plurality of third edges 570 that couples the third wall portions 480 of the third side wall 284 to the fourth wall portions 346 of the fourth side wall 286. In the illustrated embodiment, the transition portion 24 also includes the diagonal portions 453, which include the first diagonal surface 454, the second diagonal surface 522, and the fourth diagonal surface 456, as discussed herein. Additionally, the diagonal portions 453 include a third diagonal surface 572 that intersects the plurality of third edges 570.

In the illustrated embodiment, the transition portion 24 includes an annular surface 573 which interfaces with the inlet portion 23. An octagonal outer boundary 574 of the annular surface 573 is formed by flat portions 576 of diagonal portions 453, along with the first side wall 281, the second side wall 282, the third side wall 284, and the fourth side wall 286. In the illustrated embodiment, the inlet portion 23 extends in the longitudinal direction 30. As shown, an inlet cross-section 578 of the inlet portion 23 is circular in shape. An aperture 580 of the inlet portion 23 is centrally disposed in the inlet portion 23 and extends through an inner boundary 579 (e.g., inner circular boundary) of the annular surface 573.

In the illustrated embodiment, the pluralities of first wall portions 290, second wall portions 318, and third wall portions 480 each have flat exterior surfaces. That is, the first exterior surfaces 304, the second exterior surfaces 332, and the third exterior surfaces 494 are flat surfaces (e.g., not curved). In the illustrated embodiment, the fourth exterior surfaces 360 of the fourth wall portions 346 are slightly curved inward, such that fourth exterior surfaces 360 are concave. In the illustrated embodiment, the transition portion 24 includes a plurality of transition cross-sections 582. As shown, the plurality of transition cross-sections 582 are substantially rectangular, wherein substantially rectangular includes the four side walls 280 arranged in a rectangular shape, although the side walls 280 may include some variation (e.g., variation in flatness, angles, etc.). For example, the term "substantially rectangular" may allow for up to (or less than) 1, 2, 3, 4, 5, 6, 7, 8, 9, or 10 percent deviation from a straight line along each of the four side walls 280, wherein the deviation may be calculated by dividing a maximum height (H) away from the straight line by a total length (L) of the straight line (e.g., deviation=H/L) along each of the side walls 280. By further example, the term "substantially rectangular" may allow for up to (or less than) 1, 2, 3, 4, 5, 6, 7, 8, 9, or 10 degrees of deviation from 90 degrees between each pair of adjacent sides of the four side walls 280. In certain embodiments, the fourth exterior surfaces 360 are flat exterior surfaces, such that each of the plurality of transition cross-sections 582 of the transition portion 24 is rectangular. In certain embodiments, at least one of the pluralities of first wall portions 290, second wall portions 318, third wall portions 480, or fourth wall portions 346 has flat exterior surfaces.

Figure 6:
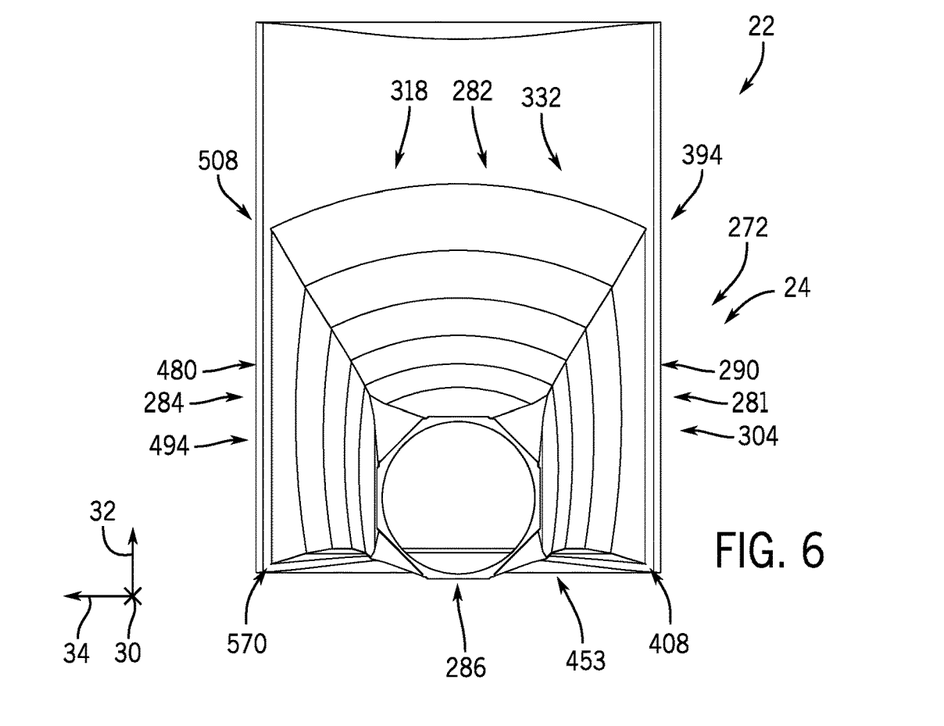
FIG. 6 is a front view of an embodiment of the exhaust diffuser system of FIG. 2, illustrating aspects of the transition portion of the exhaust diffuser system having a plurality of incrementally angled curved wall portions.

FIG. 6 is a front view of an embodiment of the exhaust diffuser system 22 of FIG. 2, illustrating an embodiment of the transition portion 24 of the exhaust diffuser system 22 having a plurality of incrementally angled wall portions 272. In the illustrated embodiment, the transition portion 24 includes the first side wall 281, the second side wall 282, the third side wall 284, and the fourth side wall 286, as discussed herein. The transition portion 24 also includes the plurality of first edges 394, the plurality of second edges 508, the plurality of third edges 570, and the plurality of fourth edges 408, as discussed herein.

In the illustrated embodiment, the pluralities of first wall portions 290, second wall portions 318, and third wall portions 480 each have outwardly curved exterior surfaces. That is, each of the first exterior surfaces 304, the second exterior surfaces 332, and the third exterior surfaces 494 curve (e.g., bend, bow) outward relative to the axial direction 30. In certain embodiments, the fourth exterior surfaces 360 also curve outward relative to the axial direction 30. In certain embodiments, at least one of the pluralities of first wall portions 290, second wall portions 318, third wall portions 480, or fourth wall portions 346 has curved exterior surfaces. It should be understood that "curved" may mean any outwardly (e.g., outwardly convex) curved shape. For example, at least one of the plurality of wall portions 272 may be frustoconical (e.g., tapered), parabolic, or elliptic in shape. In certain embodiments, a radius of curvature (e.g., outward curve) of the first wall portions 290, second wall portions 318, and third wall portions 480 may be at least equal to or greater than (e.g., 1, 1.1, 1.2, 1.3, 1.4, 1.5, 2, 3, 4, or 5 times) a height in the vertical direction 32 and/or a width in the lateral direction 34 at an axial position of the radius of curvature along the axial direction 30.

Figure 7:
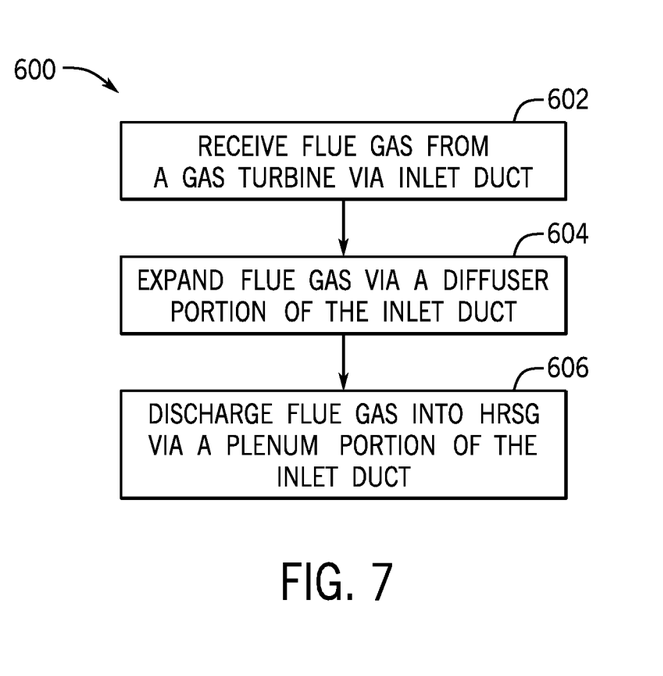
FIG. 7 is a flowchart of an embodiment of a process for operating an inlet portion of the exhaust diffuser system of FIG. 2.

FIG. 7 is a flowchart of an embodiment of an example process 600 for operating an inlet duct of an HRSG (i.e., the exhaust diffuser system of FIG. 2). In block 602 of the process 600, the inlet duct receives an exhaust flow (e.g., flue gas) from a gas turbine via an inlet portion of the inlet duct. In block 604 of the process 600, the inlet duct expands the exhaust flow in the diffuser portion. An outlet extent of an outlet portion of the inlet duct is greater than an inlet extent of the inlet portion. The outlet and inlet extents are crosswise to an axial extent between the inlet and outlet portions. The diffuser portion includes a plurality of wall portions. The plurality of wall portions is incrementally angled relative to the axial extent. The incrementally angled wall portions are configured to mitigate flow detachment of the exhaust flow from an interior surface of the diffuser portion.

In block 606, the inlet duct discharges the exhaust flow (e.g., flue gas) into the HRSG via a plenum defined by a coupling portion 26 fluidly coupled to the diffuser portion. In certain embodiments, the process 600 includes the plenum laterally expanding the exhaust flow via the plenum.

The plenum includes a curved wall extending crosswise to the axial extent between the inlet and outlet portions of the inlet duct. The curved wall further mitigates flow detachment of the exhaust flow from the interior surface of the inlet duct prior to entering the HRSG.

Technical effects of the disclosed embodiments include the ability to mitigate flow detachment of an exhaust flow in an inlet duct to an HRSG (i.e., an exhaust diffuser system). The inlet duct in the disclosed embodiments includes a diffuser portion having a plurality of incrementally angled wall portions. The incremental angling (e.g., gradual angling) of the wall portions is configured to mitigate flow detachments of the exhaust flow (e.g., flue gas) from an interior surface of the inlet duct. The mitigation of flow detachment results in a larger proportion of the exhaust flow remaining near the interior surface, thereby reducing pressure loss inside the inlet duct. Additionally, the mitigation of flow detachments results in a reduced level of turbulence/recirculation, thereby resulting in an increased cross-section available to the flow to pass through from the inlet to the HRSG. The larger cross section leads to a lower average cross-sectional velocity, which further mitigates flow detachment and reduces pressure losses. The reduction in pressure loss results in a higher static pressure recovery, which drives higher gas turbine output while maintaining homogenous heat exchanger flow. Additionally, the curved shape of the coupling duct that couples the inlet duct to the HRSG smoothly guides the exhaust flow to the heat exchanger, thereby reducing turbulence in the exhaust flow. Furthermore, the incrementally angled wall portions provide additional mechanical strength to the inlet duct. That is, the bends (e.g., boundaries, welds, etc.) where the incremental wall portions are joined provide an additional stiffening effect. This additional stiffening effect reduces the cost needed to construct external structures used to prevent vibration of the inlet duct panels due to overpressure.

The subject matter described in detail above may be defined by one or more clauses, as set forth below.

A system (10) includes an exhaust diffuser system (22) for a heat recovery steam generator (HRSG) (16). The system (10) includes an inlet portion (23), a diffuser portion (24) axially extending from the inlet portion (23), and an outlet portion (26) fluidly coupled to an axial distal end of the diffuser portion (24), wherein an outlet extent (252) of the outlet portion (26) is greater than an inlet extent (254) of the inlet portion (23). The diffuser portion (24) includes a plurality of wall portions (272), and the plurality of wall portions (272) is incrementally angled relative to an axial extent (258) extending from the inlet portion (23) to the outlet portion (26).

The system (10) of the preceding clause, wherein the diffuser portion (24) includes a first side (281) including a first plurality of wall portions (290) of the plurality of wall portions (272), a second side (282) including a second plurality of wall portions (318) of the plurality of wall portions (272), a third side (284) including a third plurality of wall portions (480) of the plurality of wall portions (272), a fourth side (286) including a fourth plurality of wall portions (346) of the plurality of wall portions (272), or a combination thereof.

The system (10) of any preceding clause, wherein the first plurality of wall portions (290) includes four or more wall portions, the second plurality of wall portions (318) includes four or more wall portions, the third plurality of wall portions (480) includes four or more wall portions, the fourth plurality of wall portions (346) includes four or more wall portions, or a combination thereof.

The system (10) of any preceding clause, wherein at least one of the first plurality of wall portions (290), the second plurality of wall portions (318), the third plurality of wall portions (480), and the fourth plurality of wall portions (346) include flat wall portions.

The system (10) of any preceding clause, wherein at least one of the first plurality of wall portions (290), the second plurality of wall portions (318), the third plurality of wall portions (480), and the fourth plurality of wall portions (346) include wall portions outwardly curved relative to the axial extent (258).

The system (10) of any preceding clause, wherein the diffuser portion (24) includes a plurality of substantially rectangular cross-sections formed by the first plurality of wall portions (290), the second plurality of wall portions (318), the third plurality of wall portions (480), and the fourth plurality of wall portions (346).

The system (10) of any preceding clause, wherein the diffuser portion (24) includes an annular surface (573) configured to interface with the inlet portion (23), wherein an outer boundary (574) of the annular surface (573) is octagonal in shape.

The system (10) of any preceding clause, wherein an angle (374, 384) spanning adjacent exterior surfaces (232, 360) of successive wall portions (318, 346) of the plurality of wall portions (272) defining opposing side walls (282, 286) of the diffuser portion (24) is between 165 and 178 degrees.

The system (10) of any preceding clause, wherein the plurality of wall portions (272) includes at least one wall portion having a frustoconical shape.

The system (10) of any preceding clause, wherein the outlet portion (26) includes a curved wall (256) extending crosswise to the axial extent (258).

The system (10) of any preceding clause, wherein the diffuser portion (24) is coupled to a convex side (260) of the curved wall (256) of the plenum (26).

The system (10) of any preceding clause, wherein a curvature associated with the curved wall (256) begins to increase at a position (544) along a lateral extent (524) of the plenum (26), wherein the position (544) is less than 10 percent of a total length of the lateral extent (524) away from a lateral distal end (546) of the plenum (26).

The system (10) of any preceding clause, wherein a lateral wall (448, 450) of the plenum is coupled to the curved wall (256) and extends crosswise from the curved wall (256), wherein the lateral wall (448, 450) is convexly curved relative to a central axis (434) of the plenum (26).

The system (10) of any preceding clause, wherein an interface perimeter of an interface (264) of the plenum (26) is configured to align with and couple to a side perimeter of a side surface (262) of the HRSG (16), and a concave side (270) of the curved wall (256) is configured to fluidly couple to the HRSG (16).

The system (10) of any preceding clause, including the HRSG (16) coupled to the plenum (26), and a gas turbine system (12) coupled to the inlet portion (23).

A system (10) includes a gas turbine system (12), a heat recovery steam generator (HRSG) (16), and an exhaust diffuser system (22). The exhaust diffuser system (22) includes an inlet portion (23) coupled to the gas turbine system (12), a diffuser portion (24) axially extending from the inlet portion (23), and a plenum (26) fluidly coupled to an axial distal end of the diffuser portion (24), wherein the plenum (26) is coupled to the HRSG (16), and wherein a plenum extent (252) of the plenum (26) is greater than an inlet extent (254) of the inlet portion (23). The diffuser portion (24) includes a plurality of wall portions (272, 290, 318, 480, 346), the plurality of wall portions (272, 290, 318, 480, 346) is incrementally angled relative to an axial extent (258) extending from the inlet portion (23) to the plenum (26), and the plenum (26) includes a curved wall (256) extending crosswise to the axial extent (258).

The system (10) of the preceding clause, wherein the diffuser portion (24) is coupled to a convex side (260) of the curved wall (256) of the plenum (26).

The system (10) of any preceding clause, wherein an angle (374, 384) spanning successive exterior surfaces (232, 360) of successive wall portions (318, 346) of the plurality of wall portions (272) defining opposing side walls (282, 286) of the diffuser portion (24) is between 165 and 178 degrees.

A method (600) includes receiving (602) an exhaust flow (i.e., flue gas) from a gas turbine system (12) via an inlet portion (23) of an exhaust diffuser system (22). The method (600) further includes expanding (604) the exhaust flow in a diffuser portion (24) of the exhaust diffuser system (22), wherein the diffuser portion (24) includes a plurality of wall portions (272) incrementally angled from the inlet portion (23) toward an outlet portion (26) of the exhaust diffuser system (220. The method (600) further includes discharging (606) the exhaust flow into the HRSG (16) via a plenum of the outlet portion (26), wherein the plenum includes a curved wall (256) extending crosswise to the diffuser portion (24).

The method (600) of the preceding clause, wherein an angle spanning successive exterior surfaces (232, 360) of successive wall portions (318, 346) of the plurality of wall portions (272) defining opposing side walls (282, 286) of the diffuser portion (24) is between 165 and 178 degrees.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    an exhaust diffuser system for a heat recovery steam generator (HRSG), comprising:
      an inlet portion;
      a diffuser portion axially extending from the inlet portion, wherein the diffuser portion comprises a plurality of sides arranged about a central axis of the diffuser portion; and
      an outlet portion fluidly coupled to an axial distal end of the diffuser portion;
    wherein an outlet extent of the outlet portion is greater than an inlet extent of the inlet portion, at least one side of the plurality of sides of the diffuser portion comprises a plurality of wall portions, the plurality of wall portions is incrementally angled relative to an axial extent extending from the inlet portion to the outlet portion, and the plurality of wall portions comprises four or more wall portions;
    wherein each wall portion of the plurality of wall portions is angled relative to an immediately preceding wall portion of the plurality of wall portions by an angle within a common angular range of angles between 150 degrees and 179 degrees, or angles between successive wall portions of the plurality of wall portions change by less than 10 degrees, or a combination thereof.

2. The system of claim 1, wherein the plurality of sides of the diffuser portion comprises:
    a first side comprising a first plurality of wall portions of the plurality of wall portions;
    a second side comprising a second plurality of wall portions of the plurality of wall portions;
    a third side comprising a third plurality of wall portions of the plurality of wall portions;
    a fourth side comprising a fourth plurality of wall portions of the plurality of wall portions;
    or a combination thereof.

3. The system of claim 2, wherein the first plurality of wall portions comprises four or more first wall portions, the second plurality of wall portions comprises four or more second wall portions, the third plurality of wall portions comprises four or more third wall portions, the fourth plurality of wall portions comprises four or more fourth wall portions, or a combination thereof.

4. The system of claim 3, wherein at least one of the first plurality of wall portions, the second plurality of wall portions, the third plurality of wall portions, and the fourth plurality of wall portions comprise flat wall portions.

5. The system of claim 3, wherein at least one of the first plurality of wall portions, the second plurality of wall portions, the third plurality of wall portions, and the fourth plurality of wall portions comprise wall portions outwardly curved relative to the axial extent.

6. The system of claim 3, wherein the diffuser portion comprises a plurality of substantially rectangular cross-sections formed by the first plurality of wall portions, the second plurality of wall portions, the third plurality of wall portions, and the fourth plurality of wall portions.

7. The system of claim 1, wherein the common angular range of angles is between 165 and 178 degrees.

8. The system of claim 1, wherein the plurality of wall portions comprises at least one wall portion having a frustoconical shape.

9. The system of claim 1, wherein the outlet portion comprises a curved wall extending crosswise to the axial extent.

10. The system of claim 9, wherein the diffuser portion is coupled to a convex side of the curved wall of the outlet portion.

11. The system of claim 9, wherein a curvature associated with the curved wall begins to increase at a position along a lateral extent of the outlet portion, wherein the position is less than 10 percent of a total length of the lateral extent away from a lateral distal end of the outlet portion.

12. The system of claim 9, wherein a lateral wall of the outlet portion is coupled to the curved wall and extends crosswise from the curved wall, wherein the lateral wall is convexly curved relative to the central axis.

13. The system of claim 9, wherein an interface perimeter of an interface of the outlet portion is configured to align with and couple to a side perimeter of a side surface of the HRSG, and a concave side of the curved wall is configured to fluidly couple to the HRSG.

14. The system of claim 9, comprising the HRSG coupled to the outlet portion, and a gas turbine system coupled to the inlet portion.

15. The system of claim 1 wherein the plurality of wall portions is incrementally angled relative to the axial extent extending from the inlet portion to the outlet portion with one constant angle after another between successive wall portions of the plurality of wall portions.

16. The system of claim 1, wherein each wall portion of the plurality of wall portions has an outwardly curved exterior surface that curves about the central axis.

17. A system, comprising:
a gas turbine system;
a heat recovery steam generator (HRSG); and
an exhaust diffuser system, comprising:
　an inlet portion coupled to the gas turbine system;
　a diffuser portion axially extending from the inlet portion, wherein the diffuser portion comprises a plurality of sides arranged about a central axis of the diffuser portion; and
　a plenum fluidly coupled to an axial distal end of the diffuser portion, wherein the plenum is coupled to the HRSG;
wherein a plenum extent of the plenum is greater than an inlet extent of the inlet portion, at least one side of the plurality of sides of the diffuser portion comprises a plurality of wall portions, the plurality of wall portions is incrementally angled relative to an axial extent extending from the inlet portion to the plenum, the plenum comprises a curved wall extending crosswise to the axial extent, and the plurality of wall portions comprises four or more wall portions;
wherein each wall portion of the plurality of wall portions is angled relative to an immediately preceding wall portion of the plurality of wall portions by an angle within a common angular range of angles between 150 degrees and 179 degrees, or angles between successive wall portions of the plurality of wall portions change by less than 10 degrees, or a combination thereof.

18. The system of claim 17, wherein the common angular range of angles is between 165 and 178 degrees.

19. The system of claim 17, wherein the common angular range of angles is between 150 and 179 degrees.

20. A method, comprising:
receiving an exhaust flow from a gas turbine via an inlet portion of an exhaust diffuser system;
expanding the exhaust flow in a diffuser portion of the exhaust diffuser system, wherein the diffuser portion comprises a plurality of sides arranged about a central axis of the diffuser portion, at least one side of the plurality of sides of the diffuser portion comprises a plurality of wall portions incrementally angled from the inlet portion toward an outlet portion of the exhaust diffuser system, wherein the plurality of wall portions comprises four or more wall portions; and
discharging the exhaust flow into a heat recovery steam generator (HRSG) via a plenum of the outlet portion, wherein the plenum comprises a curved wall extending crosswise to the diffuser portion;
wherein each wall portion of the plurality of wall portions is angled relative to an immediately preceding wall portion of the plurality of wall portions by an angle within a common angular range of angles between 150 degrees and 179 degrees, or angles between successive wall portions of the plurality of wall portions change by less than 10 degrees, or a combination thereof.

21. The method of claim 20, wherein the common angular range of angles is between 165 and 178 degrees.

22. A system, comprising:
a gas turbine system;
a heat recovery steam generator (HRSG); and
an exhaust diffuser system, comprising:
　an inlet portion coupled to the gas turbine system;
　a diffuser portion axially extending from the inlet portion; and
　a plenum fluidly coupled to an axial distal end of the diffuser portion, wherein the plenum is coupled to the HRSG;
wherein a plenum extent of the plenum is greater than an inlet extent of the inlet portion, the diffuser portion comprises a plurality of wall portions, the plurality of wall portions is incrementally angled relative to an axial extent extending from the inlet portion to the plenum, the plenum comprises a curved wall extending crosswise to the axial extent, and the diffuser portion is coupled to a convex side of the curved wall of the plenum.

23. A system, comprising:
an exhaust diffuser system for a heat recovery steam generator (HRSG), comprising:
　an inlet portion;
　a diffuser portion axially extending from the inlet portion; and
　an outlet portion fluidly coupled to an axial distal end of the diffuser portion;
wherein an outlet extent of the outlet portion is greater than an inlet extent of the inlet portion, the diffuser portion comprises a plurality of wall portions, the plurality of wall portions is incrementally angled relative to an axial extent extending from the inlet portion to the outlet portion, the diffuser portion comprises an annular surface configured to interface with the inlet portion, an outer boundary of the annular surface is octagonal in shape, and the plurality of wall portions comprises four or more wall portions.

* * * * *